United States Patent [19]
Favot et al.

[11] Patent Number: 5,809,269
[45] Date of Patent: Sep. 15, 1998

[54] METHOD AND DEVICE FOR THE ANALYSIS OF A MESSAGE GIVEN BY INTERACTION MEANS TO A MAN/MACHINE DIALOG SYSTEM

[75] Inventors: Jean-Jacques Favot, Martignas En Jalles; Jean-Noël Perbet, Eysin Es; Bruno Barbier, Le Bouscat; Patrick Lach, Bordeaux, all of France

[73] Assignee: Sextant Avionique, Meudon La Foret, France

[21] Appl. No.: 797,207

[22] Filed: Feb. 11, 1997

Related U.S. Application Data

[63] Continuation of Ser. No. 547,117, Oct. 23, 1995, abandoned, which is a continuation of Ser. No. 132,248, Oct. 6, 1993, abandoned.

[30] Foreign Application Priority Data

Oct. 6, 1992 [FR] France .................................. 92 11816

[51] Int. Cl.$^6$ ..................................... G06F 17/20
[52] U.S. Cl. .......................... 395/376; 395/2.4; 395/2.44; 395/2.69
[58] Field of Search .................................... 395/2.4, 2.44, 395/2.69, 2.84

[56] References Cited

U.S. PATENT DOCUMENTS

| | | | |
|---|---|---|---|
| 4,988,981 | 1/1991 | Zimmerman et al. | 345/158 |
| 5,099,425 | 3/1992 | Yuji et al. | 364/419.08 |
| 5,157,384 | 10/1992 | Greanias et al. | 345/156 |
| 5,163,111 | 11/1992 | Baji et al. | 395/22 |
| 5,252,951 | 10/1993 | Tannenbaum et al. | 395/156 |
| 5,320,538 | 6/1994 | Baum | 434/307 |
| 5,321,608 | 6/1994 | Namba | 364/419.08 |
| 5,360,971 | 11/1994 | Kaufman et al. | 250/221 |
| 5,463,696 | 10/1995 | Beernink et al. | 382/186 |
| 5,502,774 | 3/1996 | Bellegarda et al. | 382/159 |

FOREIGN PATENT DOCUMENTS

| | | | |
|---|---|---|---|
| 0450196 | 4/1990 | European Pat. Off. | G06F 3/33 |
| 0405732 | 5/1990 | European Pat. Off. | G06F 15/31 |

OTHER PUBLICATIONS

Salisbury et al. "Talk and Draw: Bundling Speech & Graphics" Aug. 1990 pp. 59–65.

Systems and Computers in Japan, vol. 23, No. 3, 1992, Tomoichi Takahashi, et al., "A Hand Gesture Recognition Method and Its Application", pp. 38–48.

Information Processing 71, vol. 1, Aug. 1971, D.R. Reddy, "Speech Recognition: Prospects For The Seventies", pp. 11–18.

Proceedings of the Fourth International Joint Conference on Pattern Recognition, Nov. 1978, Jean–Paul Haton, et al., "Data–Structures and Architecture of Myrtille II Speech Understanding System", pp. 1033–1038.

1991 International Conference on Acoustics, Speech, and Signal Processing, May 1991, vol. 2, R. De Mori, et al., "A Probabilistic Approach to Person–Robot Dialogue", pp. 797–800.

Primary Examiner—Ayaz R. Sheikh
Assistant Examiner—Sumati Lefkowitz
Attorney, Agent, or Firm—Oblon, Spivak, McClelland, Maier & Neustadt, P.C.

[57] ABSTRACT

A method for the analysis of a message given by an interaction device to a system of man-machine dialog includes three consecutive steps, a first step of syntactic analysis, a second step of semantic analysis and a third step of execution analysis. The syntactic analysis assesses the conformity of a message given by the interaction device with a predefined form of dialog, the semantic analysis assesses the meaning of the request made by the operator engaging in dialog with the machine, and the execution analysis determines the performance of an action to be undertaken coming from the step of semantic analysis. The invention finds particular application in systems of manmachine dialog having many kinds of interaction such as speech, gesture, and expressions.

8 Claims, 4 Drawing Sheets

METHOD AND DEVICE FOR THE ANALYSIS OF A MESSAGE GIVEN BY INTERACTION MEANS TO A MAN/MACHINE DIALOG SYSTEM

This application is a continuation application Ser. No. 08/547,117, filed on Oct. 23, 1995 now abandoned, which is a continuation of application Ser. No. 08/132,248 filed on Oct. 06, 1993, now abandoned.

BACKGROUND OF THE INVENTION

Field of the Invention

The present invention relates to a method and device for the analysis of a message given by interaction means to a man-machine dialog system. It can be applied notably to man-machine interaction systems comprising several means of interaction such as speech, gesture or the action of looking, for example.

In a man-machine interaction system, an operator's activity is sensed by man-to-machine interaction means or input interaction means. Different modules may be assigned, for example, to the processing of the information elements given by these interaction means. Since the interaction means are generally of several types, these information elements that are provided are called multimedia messages. A module may, for example, express the operator's activity in the form of events, and these events may subsequently be analyzed by another module and, finally, a third module may send them towards the application.

One limitation of such systems is that any action of the user is expressed in the form of dated events, namely events that are finite, localized and greatly spaced apart in time. A continuous type of information element such as, for example, the shifting of the hand or of the gaze is thus lost, making it impossible to manage continuous actions, notably the continuous shifting of a virtual object or the adjusting of a virtual setting.

Consequently, these man-machine interaction systems can hardly be used in applications such as the piloting of an aircraft notably, where the flow of information elements to be taken into account is becoming increasingly great and where the time available for taking decisions is becoming increasingly short.

SUMMARY OF THE INVENTION

The aim of the invention is to overcome the above-mentioned drawbacks, notably by enabling a real-time analysis of a multimedia message formed by characteristic elements of the operator's activity at a given instant.

To this effect, an object of the invention is a method for the analysis of a message containing events and continuous data elements that come from an operator and are transmitted by interaction means to a system of dialog between a man and a machine, wherein said method comprises three consecutive steps, a first step of syntactic analysis, a second step of semantic analysis and a third step of execution analysis, the syntactic analysis assessing the conformity of a message given by interaction means with respect to a predefined form of dialog, the semantic analysis assessing the meaning of the operator's request and the execution analysis determining the performance of an action to be undertaken coming from the step of semantic analysis.

An object of the invention is also a device for the implementation of the above-mentioned method.

The main advantages of the invention are that it improves the ergonomical qualities of the systems of man-machine dialog, enables these systems to process a greater number of information elements in a shorter time, makes them more efficient and more reliable notably by keeping the operator in the loop of interactivity, and is economical and easy to implement.

BRIEF DESCRIPTION OF THE DRAWINGS

Other features and advantages of the invention shall appear from the following description, made with reference to the appended drawings, of which.

DESCRIPTION OF THE INVENTION

Figure 1:
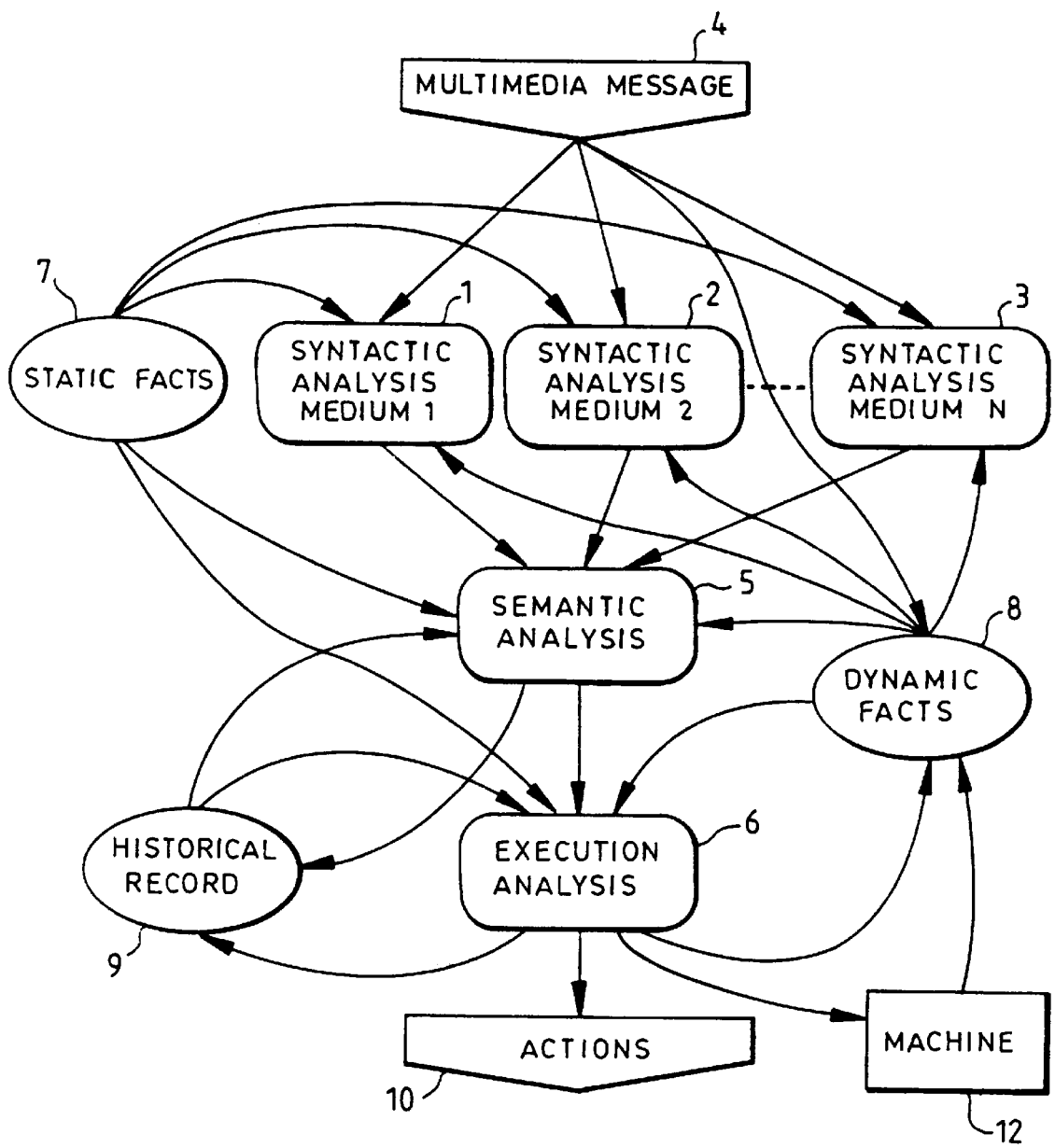
FIG. 1 shows an illustration of the method according to the invention.

FIG. 1 illustrates the method of analysis according to the invention. In this figure, the direction of the arrows indicates the direction of the information elements, an arrow indicating the passage of information elements from one point to another. The principle of the method according to the invention is that of carrying out a gradual analysis of multimedia messages in three consecutive steps, a first step of syntactic analysis, a second step of semantic analysis and a third step of execution analysis. This analysis of a multimedia message, this message being the result of an action of man on the machine, should make it possible to bring out its semantic aspect and to deduce therefrom the corresponding actions to be undertaken. A message is formed by events that are random by nature, spoken phrases and hand postures for example, and is also constituted by continuous and non-random data elements, notably measurements of positions, of the hand or direction of view for example. This message reaches the means of analysis cyclically, and upon request by these means for example. The rate at which the messages arrive must notably be sufficient so to give an impression of real time on the human scale and so as not to lose continuous information elements. To this effect, the duration between two consecutive messages may be smaller than 100 ms for example.

FIG. 1 shows the three steps of analysis according to the invention. The first step 1, 2, 3 carries out syntactic analyses of a multimedia message 4 given by man-machine interaction means known to those skilled in the art. FIG. 1 shows a case where the message 4 contains information elements given by N media. The information relating to each medium is analyzed separately. These analyses may be done, for example, in parallel and independently. Indeed, in a first step 1, 2, 3, a first syntactic analysis 1 processes a first medium, a second syntactic analysis 2 processes a second medium and an Nth syntactic analysis processes an Nth medium, N being a whole number greater than or equal to 1.

The results of the first step 1, 2, 3 of syntactic analysis are then analyzed in the second step 5 of semantic analysis. Then, the results of this second step are analyzed in the third step 6 of execution analysis. This last step determines notably the way to carry out an action 10 to be undertaken, notably if it is achievable or not, the actions being applied to the machine 12 on which an operator interacts or to the operator via interfaces. The analysis steps 1, 2, 3, 5, 6 use, for example, information elements coming from the machine 12.

Bases of facts 7, 8 give, for example, information elements to the means of analysis during the above mentioned three steps 1, 2, 3, 5, 6. A static facts base 7 may give, for example, predefined information elements relating notably to the vocal or gestural vocabulary, constant data elements of the system or of the state of the system notably. A dynamic facts base 8 may be used for example to store transitory data elements such as intermediate results or again the state of the system notably. A historical record 9 is used, for example, to memorize the progress of the dialog and of the actions. The continuous data elements of the multimedia message 4 are expressed in the form of facts and are stored in the dynamic facts base 8. The advantage of this notably is that it does not saturate or encumber the analysis steps 1, 2, 3, 5, 6 with data elements that come into play only at the syntactic level for these continuous data elements are not per se events to be interpreted. These continuous data elements come into play notably in the interpretation of events, for example voice or gestural events, this interpretation making use of the dynamic facts base.

Figure 2:
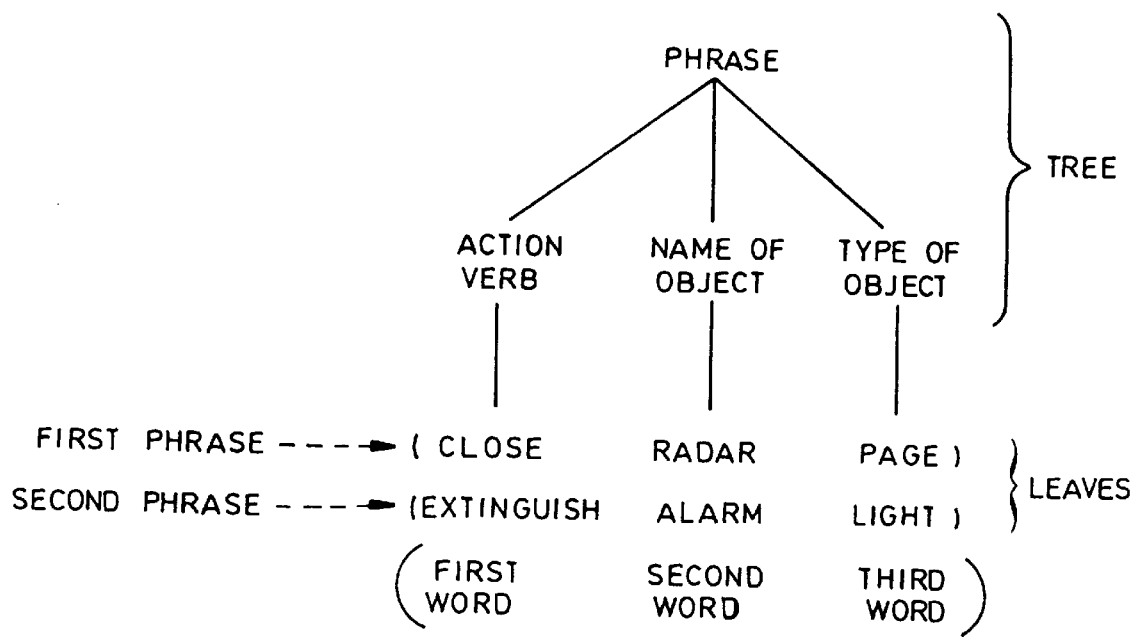
FIG. 2 shows an illustration of a step of the method according to the invention.

FIG. 2 illustrates a possible mode of syntactic analysis that can be used by the method according to the invention. The role of the step of syntactic analysis is to assess whether an event coming from a given medium or means of interaction conforms to one of the forms of dialog defined for the medium in question. In giving the appellation "syntax tree" or quite simply "tree" to each possible form of dialog of a given medium, the appellation "leaves" to the terms that occur at the ends of these trees and the appellation "phrase" to an ordered sequence of one or more words of the vocabulary of the analyzed medium, the vocal or gestural vocabulary for example, it follows that the syntactic analysis of a medium can be summarized in the identification, among the possible trees, of that tree whose ordered list of the leaves is identical, element by element, to the phrase of the multimedia message received. Once the tree is identified, the analysis step documents each word of the phrase in associating an attribute with it. This attribute defines the participation of the word in the meaning of the phrase.

FIG. 2 shows two examples of phrases to be analyzed, in the case of an application to the piloting of aircraft for example. The syntax tree defines, for example, a possible phrase of dialog as possessing an action verb followed by an object type followed by an object name. A first phrase to be analyzed is, for example, "close radar page" and a second sentence "extinguish warning light". The tree of FIG. 2 is analyzed in the first step which deduces the validity of the syntax therefrom. If the syntax is correct, the first step of syntactic analysis then delivers three words, a first word indicating the action verb, a second word indicating the name of the object and a third word indicating the type of object of the object. Other types of syntax, namely syntactic trees, may be analyzed and may comprise notably a greater or smaller number of words.

In the case of the use of certain media such as, for example, means of gestural recognition, these media may necessitate particular modes of analysis for the phrase defined here above is distributed over several messages. The syntactic analysis may then be performed sequentially and the results of the steps of syntactic analysis may be, for example, memorized in the dynamic facts base 8.

If the phrase does not correspond to a correct syntax, it is rejected and the user may, for example, be warned by a sound or visual signal, or a message.

As illustrated in FIG. 1, the first step of syntactic analysis may be constituted, for example, by several independent syntactic analyses 1, 2, 3, the number of syntactic analyses being equal to the number of media or interaction means, a medium being associated with each analysis. In this case, from the viewpoint of syntax, each medium is processed independently of the other ones. This makes it possible notably to achieve high flexibility of dialog between man and machine. Each means of analysis assigned to the analysis of the first step receives the part of the multimedia message that relates to this analysis, namely the information coming from its associated medium. Each means of analysis gives a message that is processed by the second step of semantic analysis. This message contains, for example, a part identifying the medium from which there comes the information as well as attributes of meanings assigned to the words of the phrase. A message such as this may then have the following form for example: NMedia (Atb)(first word), Atb(second word), Atb(third word) where NMedia represents an identification of a medium, Atb represents an attribute of a meaning of a word, it being possible for the first, second and third words to be, for example, the above-mentioned words, notably "close", "radar", "page". The vocabularies associated with the different medias are, for example, stored in the static facts base 7.

Once analyzed and accepted, the documented phrase is sent to means of semantic analysis carrying out the second step of the method according to the invention.

The role of the step of semantic analysis is notably to assess the meaning of the operator's request on the basis of the results of the step of syntactic analysis. It makes it possible, for example, to identify the action to be undertaken, the object of the action, i.e. what the action pertains to and the modalities of application defined by parameters. If the contents of the results of the syntactic analyses are not sufficient to establish the meaning of the request, the semantic analysis will notably attempt to achieve this by using complementary information elements that come, for example, from the facts bases 7, 8 or the historical record 9. This may be the case, for example, for requests that bring into play designations of objects, the object of the action having then come from the dynamic facts base. It is also the case, for example, for phrases that comprise ellipses, namely phrases having missing elements that refer to the prior dialog, where the meaning can only be found notably by an analysis of the historical record of the dialog.

Any semantically correct request is then processed by the third step of execution analysis. This request comprises, for example, the type of actions to be carried out, the object to which this action relates and the list of parameters to be taken into account. A request can then be sent to the step for the analysis of actions by a sequence having the following form for example:

(Action, Object, Par 1, Par 2, . . . Par N)

Action indicating the type of action, Object indicating the object to which it relates and Par 1, Par 2, . . . Par N a list of N parameters.

In the event of an incomplete request, the man-machine interaction system may, for example, ask the operator for additional information which may be provided by synthetic voice, by text or by image for example. The historical record may then serve notably to memorize the intermediate state of the request. Any request having no meaning in the context of the dialog is, for example, sanctioned by an error message.

The role of the step of execution analysis is notably to determine the performance of an action to be undertaken towards the operator or towards the machine 12 on which the operator interacts at the end of the step of semantic analysis. The analysis relates notably to the context in which the action has to take place. This context relates for example to the state of the machine of the application or of the dialog system. For example, in the case of the above-mentioned request "close radar page" for example, the execution analysis step ascertains, for example, that the radar page is open, this page being represented on a display screen, that the page is not related to another action in progress and that there is no prohibition as regards closing it.

For any action that is judged to be achievable, the execution analysis step composes a sequence of elementary commands and transmits them to an execution processor, the actions being carried out on graphic objects on a screen on a display screen or by sound for example. These commands are, for example, transmitted by a sequence having the following form:

(Cde, Par 1, Par 2, . . . Par N)

Cde designating a given command, and Par 1, Par 2 . . . Par N being a list of parameters.

Any non-achievable action is, for example, sanctioned by the emission of a vocal or visual error message.

Figure 3:
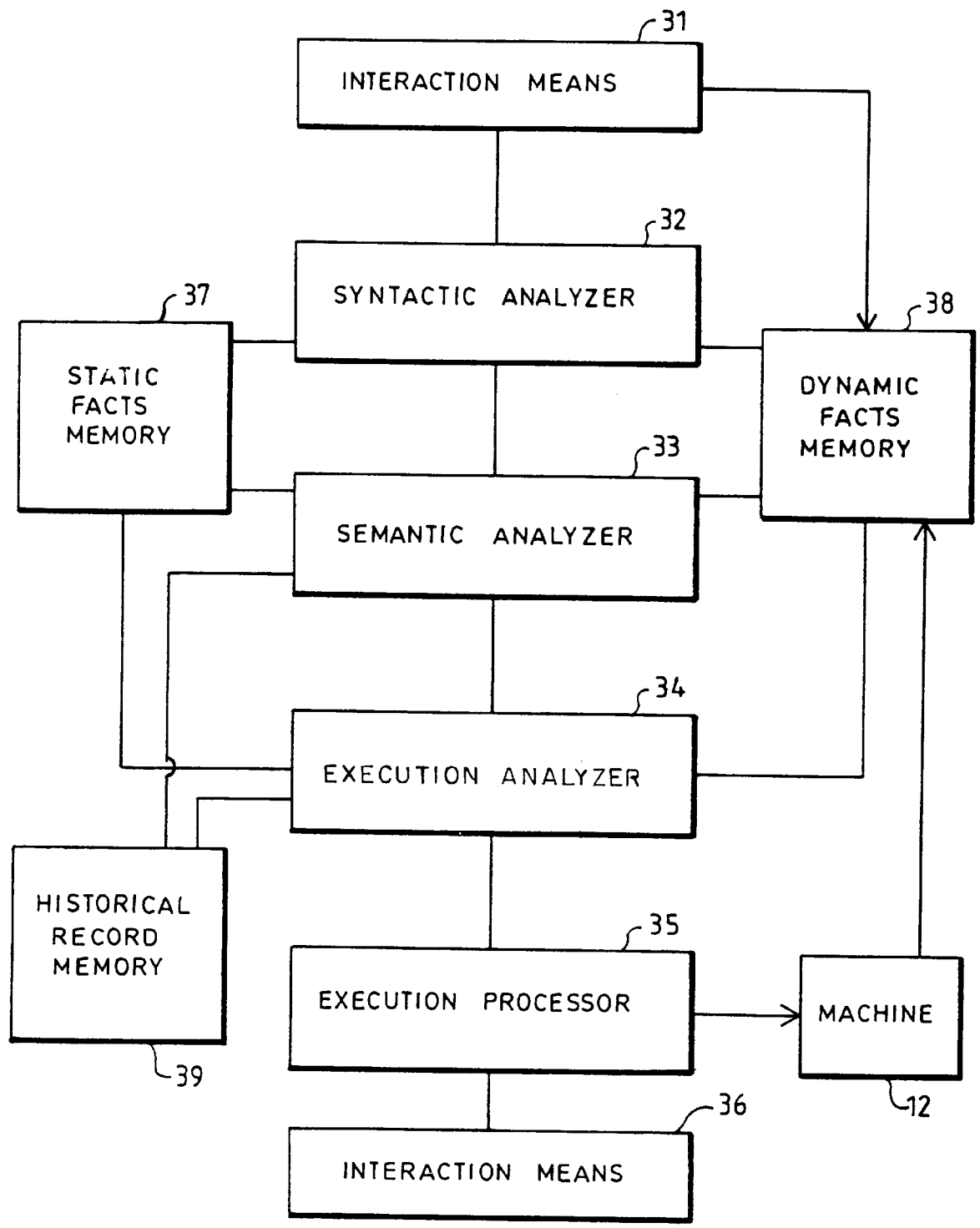
FIG. 3 shows a possible embodiment of a device according to the invention.

FIG. 3 shows shows a possible embodiment of a device for the implementation of the method according to the invention. It has, at input, interaction means 31. These means may be, for example, voice or gesture recognition means, the gestures being notably those of the operator's hand recognized by means of a data glove or any other body gesture on the part of the operator. These interaction means may further make it possible, for example, to detect the operator's direction of looking, notably by means of an oculometer, or to detect the position of the operator's head or hand by means of electromagnetic sensors. These interaction means 31 are connected to means of syntactic analysis carrying out the first step 1, 2, 3 of the method according to the invention. These means of analysis contain, for example, as many independent syntax means as there are media such as voice, gesture and action of looking for example. The means of syntactic analysis 32 are connected to means of semantic analysis 33 carrying out the second step 5. These means are themselves connected to execution analysis means 34 carrying out a fourth step 6. They are coupled to an execution processor 35 which is connected to interaction means 36, means of voice synthesis or display means, a display screen for example. They are also coupled to the machine 12. The analyses means 32, 33, 34 may be implanted on a same computer or distributed over several computers, a computer being assigned to each step of analysis. A memory 37, containing the static facts, is connected to the means of analysis 32, 33, 34. Similarly, a memory 38 is connected to the means of analysis 32, 33, 34, to the machine 11 and to the interaction means 31. A memory 39 containing notably the historical record of a man-machine dialog is connected to the semantic analysis means 33 and execution analysis means 34.

Figure 4:
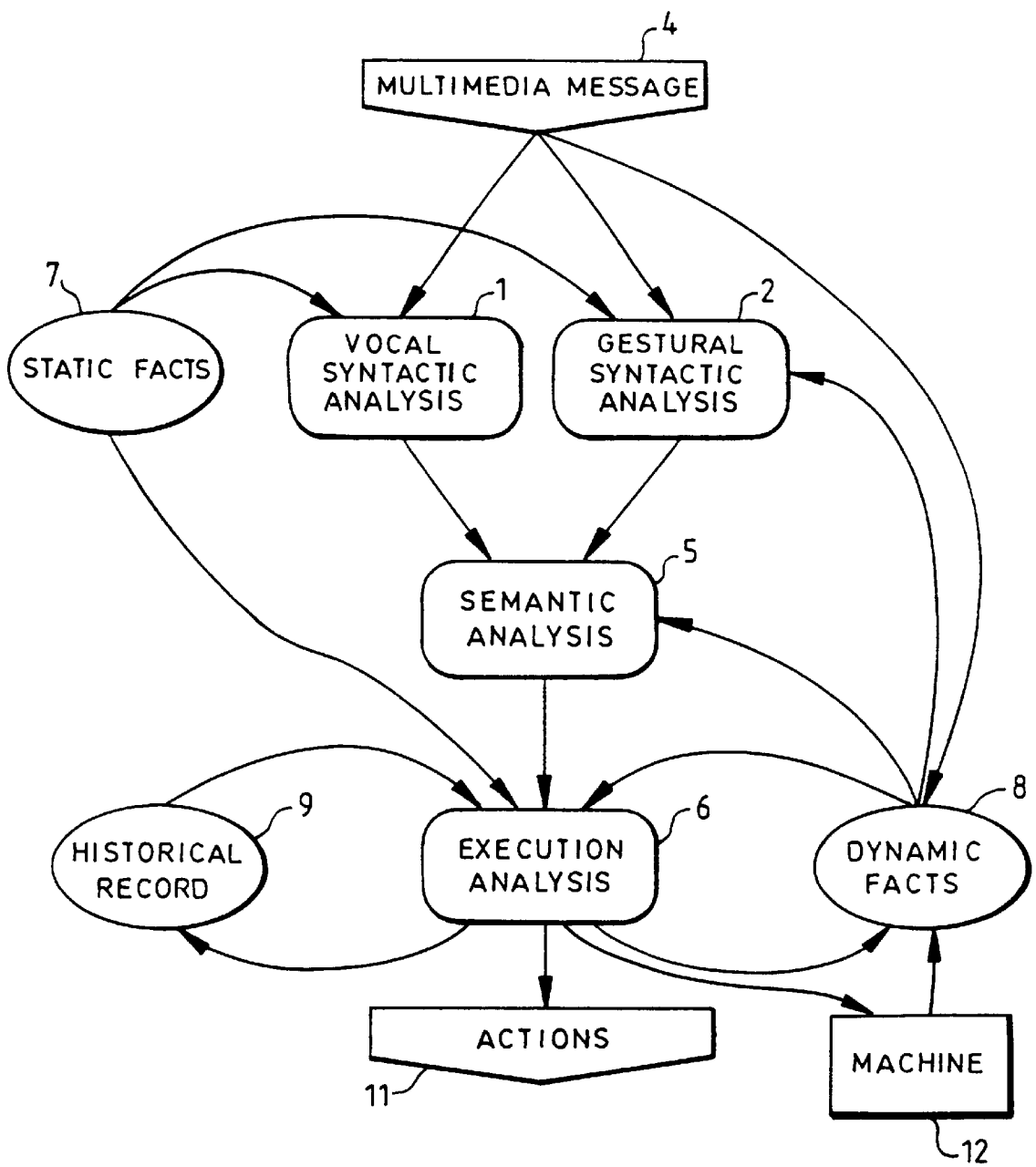
FIG. 4 shows an application of an exemplary application of the method according to the invention.

FIG. 4 illustrates an exemplary application of the method according to the invention, in the case notably of a man-machine dialog system whose means of interaction is constituted for example firstly by a screen and a voice synthesis device and, secondly, by input media constituted by the voice and by hand gestures, the gestures comprising the posture and the position of the hand.

The use of the device is designed notably to enable the management of complex systems by giving the operator extensive means of dialog such as voice, hand gestures and the action of looking for example, and output information elements of the voice or sound type. An exemplary use is the management of a virtual dashboard of an aircraft.

The illustration of FIG. 4 shows that the first step of syntactic analysis comprises a voice syntactic analysis 1 and a gestural syntactic analysis 2, each corresponding respectively to a first medium, the voice, and to a second medium, the hand gesture for example as defined here above; if necessary, the gestures could concern other parts of the body. The other steps 5, 6 are the same as those defined by FIG. 1. Similarly, the static facts base 7 and dynamic facts base 8 as well as the historical record are hinged on these steps in accordance with the description of FIG. 1. The actions defined by the execution analysis step 6 are graphic actions 11 relating to objects displayed by the screen. The actions generated by the third step 6 of execution analysis may also relate to means of voice or sound synthesis, and to the machine 12.

An expert system, also called a system with production rules, may make it possible, for example, to carry out the three steps of the method of analysis according to the invention and thus ensure the understanding of a multimedia message containing the operator's activity within a given time slot, the time of application being divided into slots of a duration of about 100 ms for example.

In the case of the application of FIG. 4, a multimedia message is transmitted, for example, to the expert system in the form of a list of computer data. This list comprises, for example, an ordered sequence of vocal words, a recognized manual posture and a designated object identification. Furthermore, it contains, for example, the distance from the operator's hand to the screen or the angular position of the hand about the axis of the arm.

The static facts base 7 is stored, for example, in a read-only memory 37 as illustrated in FIG. 3. It contains, for example, a vocal vocabulary, a postural vocabulary and default attributes, sizes and positions of graphic objects.

The dynamic facts base 8 is contained in a read/write memory 38. It contains, for example, the current positions and sizes of the objects shown on the display screen, an identifier of the designated object, the last positions and orientations of the hand, the current state of the means of gestural syntactic analysis and the state of the media, notably as regards their availability and their activation, and parameters of the machine 12.

The historical record 9 is contained in a read/write memory 39. It contains, for example, the commands in progress in the execution processor 35 and the objects undergoing manipulation, notably as regards their initial state and their current state.

The vocal analysis means comprise, for example, a set of rules enabling in particular the coding of the syntax and the mechanism for searching for the previously defined syntactic tree. It gives the tree that has been found to the semantic analysis means.

The means of gestural analysis comprise, for example, an automaton with finite states. As and when the automaton functions, the means of gestural analysis send messages to the means of semantic analysis. The commands transmitted are notably words associated with a syntactic tree: these are words such as, for example, take, shift, lay down, throw, reduce or increase, these commands being applied to a graphic object.

The means of semantic analysis comprise a set of rules whose role, notably, is to interpret the meaning of the incoming messages to synthesize the actions to be undertaken.

At output, they give a message indicating the action to be carried out, the object of the action and various associated parameters. They identify the action by using notably the previously defined associated attribute words and by reconstituting them from the context of the dialog. They identify the object of the action by using the associated attribute word or by reconstituting it from the dynamic facts base containing notably the designated object. They identify the parameters by using notably the above-mentioned attribute words Par 1, Par 2. They eliminate, for example, all the words that have no attributes.

The means of execution analysis comprise for example a set of rules whose role notably is to analyze the way in which to carry out an action coming from the means of semantic analysis and to generate the necessary elementary commands for the execution processor 35. Should the execution analysis relate to the following exemplary request (OPEN, 0, RADAR), the analysis requires at least three rules, OPEN being the action, 0 being a parameter and RADAR being the object of the action. A first rule processes the case where a graphic window associated with the object RADAR is already open, a second rule processes the case where this window is not open. A third rule processes the case where the third argument of the request, RADAR, is not a name of a window. The order in which the rules are written may be important, the analyzer assessing the foregoing rules in the above-mentioned order. It is indeed conceivable that the third rule is triggered only if the first rule and the second rule have failed.

What is claimed is:

1. A method of analyzing a message containing events and continuous data elements emanating from an operator and transmitted through a dialog system via input interaction means, said method comprising the steps of:

(a) assessing a degree of conformity of a message transmitted to said dialog system with respect to a predefined form of dialog including performing a syntactic analysis of said operator's message containing said events and continuous data elements wherein said events and continuous data elements of said operator's message comprise said operator's speech, physical gestures, and expressions and wherein said syntactic analysis includes a first syntactic analysis of said operator's speech and a second syntactic analysis of said operator's physical gestures and expressions;

(b) assessing a total meaning of said operator's message based on a first meaning from said first syntactic analysis and a second meaning from said second syntactic analysis; and (c) determining an action to be undertaken by said dialog system in accordance with said operator's message.

2. A method according to claim 1, wherein said continuous data elements are expressed in the form of facts and are stored in a dynamic facts base, and wherein said step (c) determines said action to be undertaken in accordance with said facts stored in said dynamic facts base.

3. A method according to claim 1, wherein said predefined form of dialog utilized in steps (a), (b) and (c) comprises predefined information elements stored in a static facts base.

4. A method according to claim 1, wherein said steps (a), (b) and (c) utilize information elements stored in a historical record base which represents a history of a dialog between said operator and said dialog system and actions undertaken by said dialog system.

5. A method according to claim 1, wherein said steps (a), (b) and (c) utilize information elements output from said dialog system.

6. A dialog system for engaging in a dialog with an operator by interpreting said operator's speech, physical gestures and expressions and acting in accordance therewith, said dialog system comprising:

input interaction means by which said operator's speech, physical gestures and expressions are transmitted to said dialog system;

syntactic analysis means, connected to said input interaction means for assessing a desire of conformity of a message transmitted to said dialog system with respect to a predefined form of dialog;

semantic analysis means, connected to said syntactic analysis means, for assessing a total meaning of said operator's speech, physical gestures and expressions based on a first meaning from said operator's speech and a second meaning from said operator's physical gestures and expression;

execution analysis means, connected to said semantic analysis means, for determining an action to be undertaken by said dialog system in accordance with said operator's speech, physical gestures, and expressions;

execution processing means, connected to said execution analysis means, for executing said action determined by said execution analysis means; and output interaction means, connected to said execution processing means, for outputting a result of said action to said operator wherein a number of said syntactic analysis means is equal to a number of said input interaction means.

7. A dialog system according to claim 6, further comprising:

first memory means, connected to said syntactic analysis means and to said semantic analysis means, for storing a static facts base containing predefined information elements;

second memory means, connected to said syntactic analysis means and to said semantic analysis means, for storing a dynamic facts base containing continuous data elements in the form of facts; and third memory means, connected to said semantic analysis means and to said execution analysis means, for storing a record of a dialog between said operator and said dialog system and actions undertaken by said dialog system.

8. A dialog system according to claim 6, wherein said syntactic analysis means, said semantic analysis means, and said execution analysis means operate in accordance with a production rules system.

* * * * *